G. RHODES.
MACHINE FOR FILING BAND SAWS.
APPLICATION FILED DEC. 19, 1911.
1,046,645.
Patented Dec. 10, 1912.
2 SHEETS—SHEET 1.
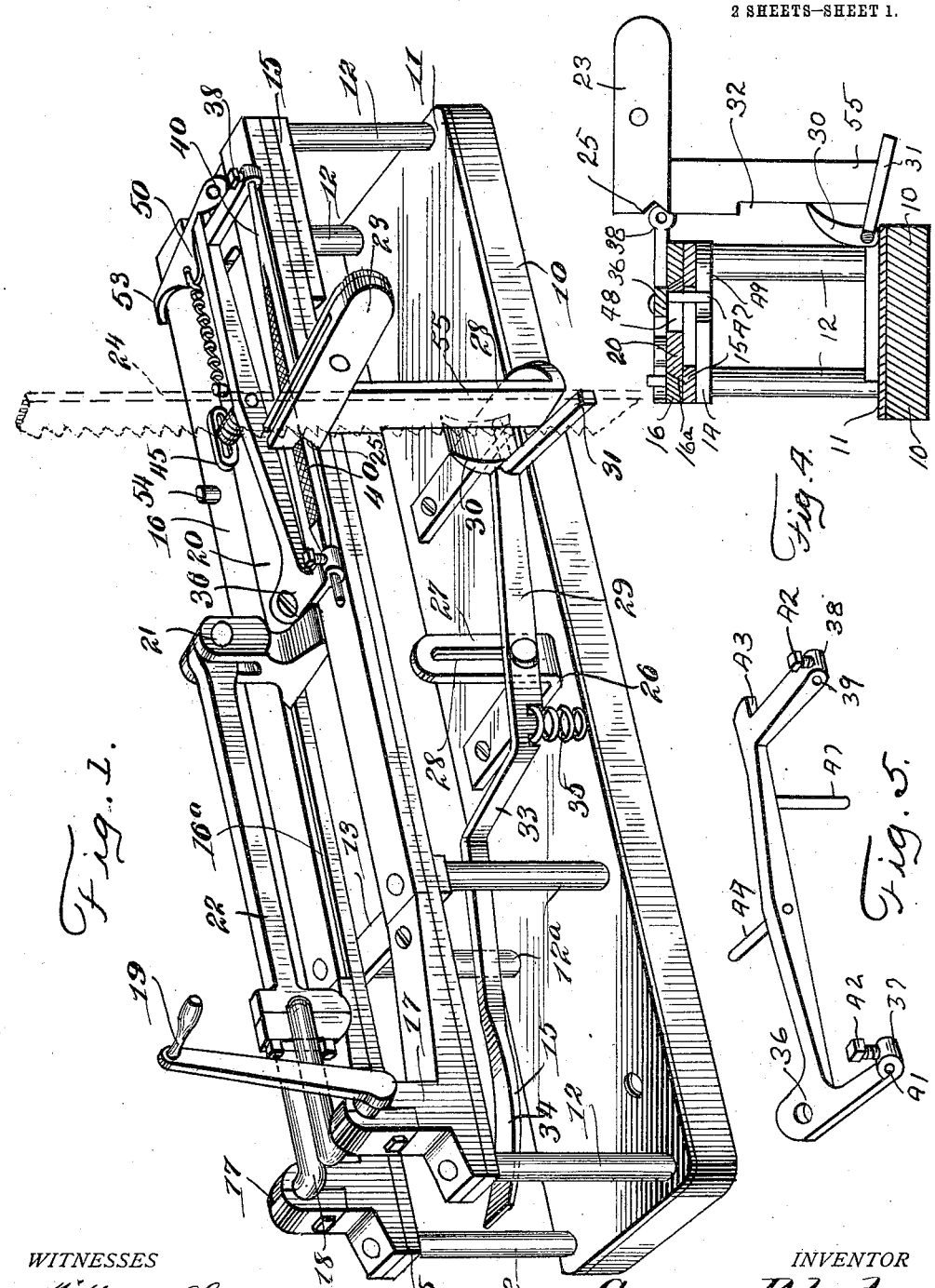
WITNESSES
INVENTOR
George Rhodes.
By
Attorney G. RHODES.
MACHINE FOR FILING BAND SAWS.
APPLICATION FILED DEC. 19, 1911.
1,046,645.
Patented Dec. 10, 1912.
2 SHEETS—SHEET 2.
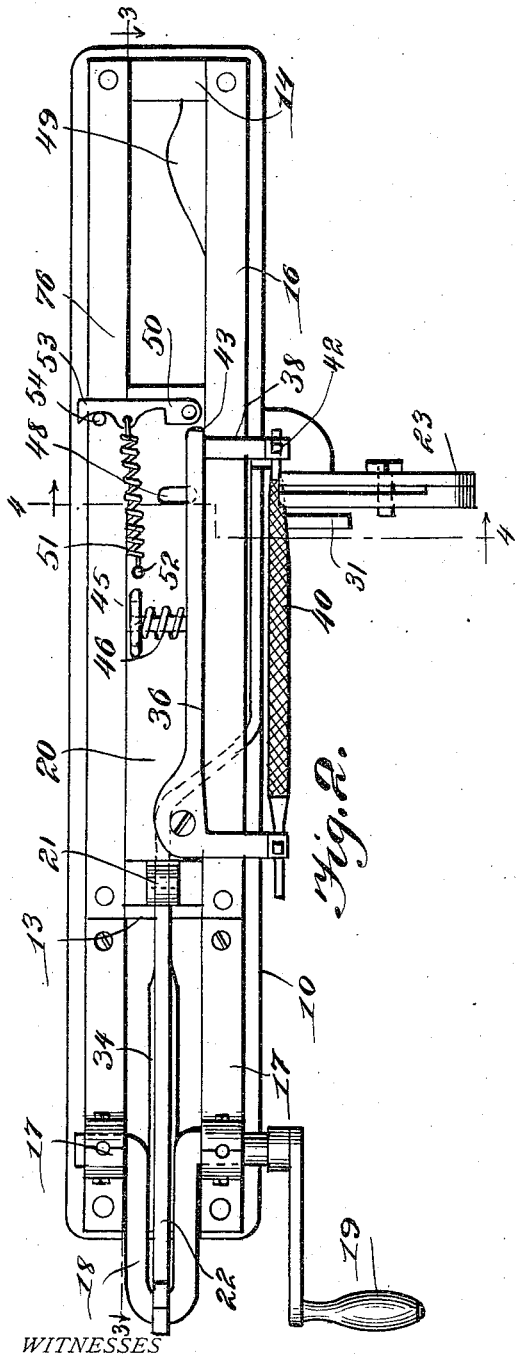
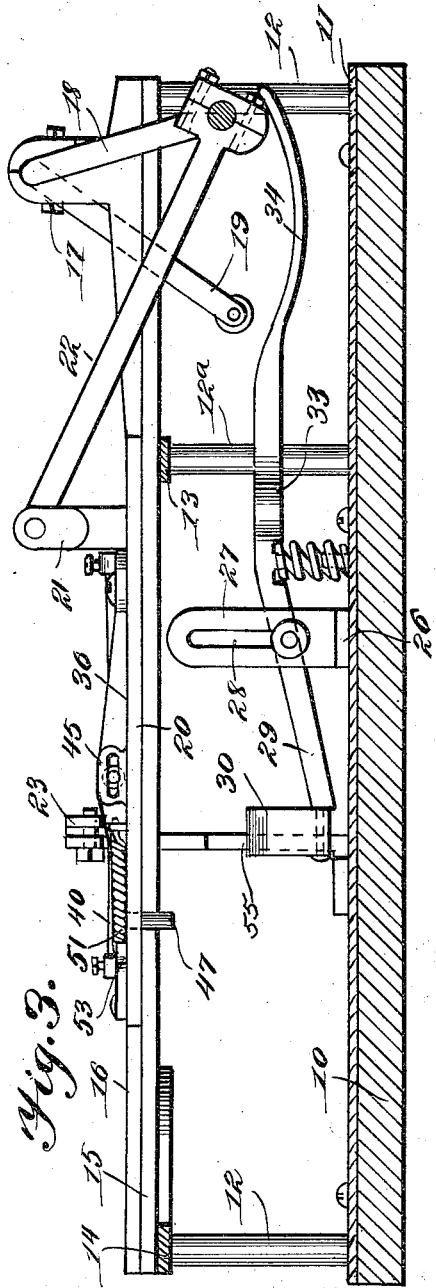
WITNESSES
William C. Linton
Charles S. Wilvy
INVENTOR
George Rhodes.
By Wm. C. W. McIntire Attorney

UNITED STATES PATENT OFFICE.

GEORGE RHODES, OF SHELTON, NEBRASKA.

MACHINE FOR FILING BAND-SAWS.

1,046,645.  Specification of Letters Patent.  Patented Dec. 10, 1912.

Application filed December 19, 1911. Serial No. 666,704.

*To all whom it may concern:*

Be it known that I, GEORGE RHODES, a citizen of the United States, residing at Shelton, in the county of Buffalo and State of Nebraska, have invented certain new and useful Improvements in Machines for Filing Band-Saws; and I do hereby declare the following to be a full, clear, and exact description of the invention, such as will enable others skilled in the art to which it appertains to make and use the same.

This invention relates to machines for filing the teeth of band saws without in any way removing said band saws from the machine.

It is the object of the present invention to provide a machine which may be attached to the band saw and automatically operate upon one tooth thereof at a time, said saw being fed automatically through the machine by the operation thereof.

It is further designed to provide a filing machine which will withdraw the file from engagement with the saw after a single tooth has been sharpened, and retain the file in this position until the saw has been fed and bring a new tooth in the path of the file.

With the above and other objects in view, this invention consists in the construction, combination and arrangement of parts, all as hereinafter more fully described, claimed, and illustrated in the accompanying drawings, wherein:

Figure 1 is a perspective view of a machine constructed in accordance with the present invention; Fig. 2 is a top plan view thereof; Fig. 3 is a longitudinal section taken along line 3—3 of Fig. 2; Fig. 4 is a transverse, vertical section taken along line 4—4 of Fig. 2, and Fig. 5 is a perspective view illustrating the filing support.

The saw filing machine forming the subject matter of the present invention comprises a base with a plurality of supports or standards mounted about the edges thereof. Tracks are mounted on these supports and are of such construction that a slide reciprocates therein, said slide pivotally carrying a file bracket. A crank is mounted at one terminal of the tracks and is connected by means of a link to said silde and is of such construction that the said crank imparts a reciprocatory movement to said slide.

Reference being had more particularly to the drawings, 10 indicates a base constructed preferably of wood, carrying a metal bed plate 11. A plurality of corner standards or supports 12 are mounted on the bed plate 11, while intermediate supports 12$^a$ are mounted adjacent to one pair of corner supports 12. The intermediate supports 12$^a$ and the farthest removed corner supports 12 have the transverse bars 13 and 14 interposed therebetween respectively. Supported at the upper terminals of the enlarged supports or standards 12 and 12$^a$ are the longitudinal bars 15 in combination with the supports and standards and the transverse bars 13 and 14 form a supporting frame for substantially the entire structure. Interposed between the supports or standards 12$^a$ and the farthest removed end supports or standards 12 carried by each bar 15 is a plate or bar 16. The inner surface of each bar, 16$^a$, is beveled inwardly, as clearly illustrated in Fig. 4. This construction provides a dovetail groove for the reception of the slide which operates between the plates or bars 16. Mounted on the bars 15 and interposed between the terminals of the plate 16 and the adjacent terminals of said bars 15 are split bearings 17 in which is mounted for rotation the crank shaft 18, said crank shaft being provided with a suitable handle 19 to provide for the reception thereof. A slide which constitutes the plate 20 is mounted for reciprocation between the plates 16, the longitudinal edges of said slide being beveled to conform with the inner faces 16$^a$ of the plate 16. The rear end of this slide is provided with the bearing 21 which is connected by a suitable link 22 to the crank shaft 18. Thus, upon the rotation of the crank shaft in a constant direction, the slide 20 will be reciprocated.

A bracket 55 is mounted on the bed plate 11 adjacent to the path of the plate 20 and carries at its upper terminal the horizontal guide 23 through which the saw blade 24 of the band saw passes the teeth of said saw blade, registering with the V-shaped opening 25 formed in the horizontal guide.

A bracket 26 is mounted adjacent to the bracket 55 and is provided with the vertical portion 27, said vertical portion being provided with the longitudinal slot 28. A lever 29 is pivotally mounted in said slot in such a manner that the height of the fulcrum of said lever from the bed plate 11 may be regulated. The forward terminal of the lever 29 has a pawl 30 pivoted thereto which is retained in constant engagement with the teeth of the band saw 24 by gravity weight 31 which is rigidly secured to said pawl and normally draws the pawl against the reduced portion 32 formed in the bracket 55, said reduced portion permitting the pawl to engage the teeth of the band saw and move the same upwardly as the forward terminal of the lever 29 is raised. The rear terminal is offset as at 33 and is provided with a curved bearing surface 34 which rests in the path of the crank shaft 18. A spring 35 is interposed between the lever 29 adjacent to the aforesaid portion thereof and the bed plate 11, said spring normally retaining the rear terminal 34 of the lever in an elevated position.

From the foregoing it will clearly be understood that as the crank is rotated and contacts with the bearing surface or rear terminal of the lever 34, the said terminal or bearing surface will be forced downwardly, thereby raising the forward terminal thereof, causing the pawl to feed the band saw upwardly. The number of teeth which the lever feeds upon the single rotation of the crank is dependent upon the location of the fulcrum of the lever 29, namely,—the position of the pivotal point thereof in the slot 28 of the bracket 26.

Pivotally mounted on the plate 20 adjacent to the bearing 21 thereof, is a file carrying bracket 36, said bracket being U-shaped in construction, and provided with the arms 37 and 38. The arm 38 is provided with the socket 39 wherein one terminal of the file 40 is placed and retained by a set screw 42; whereas, the opposite arm 37 is provided with the socket 41, through which a set screw 42 projects to secure the opposite terminal of the file 40. The bracket 36 is pivoted only at one terminal, the opposite terminal, namely, the terminal carrying the arm 38 is free to move, and is provided with the projection 43, the utility of which will hereinafter be more fully described.

A pin 44 is centrally carried by the bracket 36 and extends outwardly therefrom opposite to the arms 37 and 38. This pin operates in the eye 45 and is encircled by a spring 46 which is interposed between the elongated eye 45 and the body of the bracket 36. Inasmuch as the plate 20 reciprocates flush with the top of the tracks or plates 16, and that the arms 37 and 38 project beyond the adjacent track or plate 16, it will clearly be understood that the file carried by said arm will operate to one side of the frame.

Referring to the drawings, it will clearly be seen that the file 40 operates in the V-shaped depressions 25 formed in the horizontal guide 23 upon the reciprocation of the plate, and, therefore, necessarily contacts with the saw teeth carried by said guide. The provision of the spring 46 forces the bracket 36 outwardly about its pivotal point. A pin 47 is carried by the bracket 36 and operates in the slot 48 formed in the plate 20, and acts as a stop for the movement of the said bracket about its pivotal point. Thus, when the pin 47 rests against the outer terminal of the slot 48, the bracket carries the file 40 directly in the path of the teeth carried by the guide 23.

A cam surface 49 is formed below the track 16 adjacent to the side of the plate 20 carrying the bracket 36, said cam surface being of such formation that the same contacts the lower terminal of the pin 47, and forces the same inwardly toward the inner end of the slot 48. This causes the bracket 36 to move about its pivotal point, and draw the file 40 from engagement with the V-shaped openings 25 of the guide 23 upon the forward movement of the carriage. When the bracket 36 has been moved in this direction by the same surface 49, the same is retained in this position by the catch 50 mounted upon the plate 20 which is adapted to engage the projection 43 of the bracket 36. A spring 51 is interposed between the catch 50 and the pin 52 carried by the plate, and is adapted to normally draw the catch into engagement with the projection 43, causing an automatic locking of the bracket and retaining of the file from engagement with the V-shaped openings 25 of the guide 23. The free terminal of the catch 50 projects over the surface of the track 16 oppositely disposed to the track and coöperating with the cam surface 49, and is provided with a curved depression 53 which is adapted to engage the pin 54 upon the return movement of the plate and releasing the bracket 36 when the plate or slide 20 is at its extreme rearward movement.

From the foregoing it will clearly be seen that after the file is at its extreme limit of its forward movement it is withdrawn from engagement with the teeth of the saw by the mechanism heretofore described. After the same has been withdrawn from its operative position the slide or plate 20 is moved rearwardly, and the crank 18 downwardly to contact with the curved band and surface 34 of the lever 29. This is done previous to the release of the bracket 36 and consequently just previous to the engagement of the V-shaped grooves 25 of the guide 23 by the file 40. Thus, the saw is fed previous to the release of the file and the operation thereon by the said file.

Having thus fully described my invention, what I claim as new, and desire to secure by U. S. Letters Patent, is:

1. In a saw filing machine, a frame, a carriage mounted on the frame, a U-shaped file bracket pivotally mounted on the carriage, arms on said bracket provided with alined sockets, a file mounted in said sockets, a set screw through one socket, a projection on the free end of said bracket, means for engaging said projection for holding the file out of engagement with the work, a spring pressed pin centrally of the bracket disposed parallel to the arms thereof and in opposition thereto, to hold the file normally in engagement with the work, a downwardly projecting pin midway between said spring pressed pin and the free end of the bracket, means for engaging said pin to deflect the file obliquely from the work on the forward movement of the carriage, means for reciprocating the carriage and means for supporting a saw adjacent to the file.

2. In a saw filing machine, a frame, a carriage reciprocally mounted on the frame, a link journaled to the carriage, a crank shaft journaled to the link, a file bracket pivoted to the carriage and adapted to support a file, a horizontal guide mounted on the frame, adjacent to the file bracket, a second bracket mounted on the frame in vertical alinement with the guide, a third bracket provided with a vertical slot mounted on the frame between said first bracket and said crank shaft, a lever provided with a rectangular offset fulcrumed in said slot, a pawl mounted on said lever adjacent to said second bracket adapted to engage the teeth of a saw mounted in said second bracket and said horizontal guide, a spring supporting said lever between said third bracket and said crank shaft, a curved bearing surface on said lever in the path of the crank shaft adapted to be engaged by said crank shaft to elevate the saw blade in said first bracket and said horizontal guide upon the reciprocation of the carriage.

In testimony whereof I affix my signature in presence of two witnesses.

GEORGE RHODES.

Witnesses:
J. H. BLISS,
W. C. EASTER.

---

Copies of this patent may be obtained for five cents each, by addressing the "Commissioner of Patents, Washington, D. C."